United States Patent
Lennie et al.

(10) Patent No.: US 7,801,959 B1
(45) Date of Patent: Sep. 21, 2010

(54) METHOD AND SYSTEM FOR PUSHING ELECTRONIC MESSAGES TO A WIRELESS PORTABLE DEVICE USING A STANDARD MAIL SERVER INTERFACE

(75) Inventors: Robert Lennie, Sunnyvale, CA (US); Carl C. Chen, Mountain View, CA (US); Gabe C. Dalbec, San Jose, CA (US)

(73) Assignee: PalmSource, Inc., Sunnyvale, CA (US)

( * ) Notice: Subject to any disclaimer, the term of this patent is extended or adjusted under 35 U.S.C. 154(b) by 556 days.

(21) Appl. No.: 09/872,451

(22) Filed: May 31, 2001

(51) Int. Cl.
*G06F 15/16* (2006.01)
(52) U.S. Cl. .............. 709/206; 709/204; 709/205; 455/412.1; 455/414.1
(58) Field of Classification Search ......... 709/204–206, 709/213, 248; 707/3, 500; 455/412.1, 414.1
See application file for complete search history.

(56) References Cited

U.S. PATENT DOCUMENTS

| | | | | |
|---|---|---|---|---|
| 5,995,597 | A * | 11/1999 | Woltz et al. | 379/93.24 |
| 6,005,845 | A * | 12/1999 | Svennesson et al. | 370/260 |
| 6,138,158 | A * | 10/2000 | Boyle et al. | 709/225 |
| 6,237,027 | B1 * | 5/2001 | Namekawa | 709/206 |
| 6,243,739 | B1 * | 6/2001 | Schwartz et al. | 709/206 |
| 6,289,212 | B1 * | 9/2001 | Stein et al. | 455/412.1 |
| 6,333,973 | B1 * | 12/2001 | Smith et al. | 379/88.12 |
| 6,421,707 | B1 * | 7/2002 | Miller et al. | 709/206 |
| 6,463,463 | B1 * | 10/2002 | Godfrey et al. | 709/206 |
| 6,665,548 | B2 * | 12/2003 | Kuwabara | 455/567 |
| 6,850,757 | B2 * | 2/2005 | Watanabe et al. | 455/412.2 |
| 6,912,398 | B1 * | 6/2005 | Domnitz | 455/461 |
| 2002/0120696 | A1 * | 8/2002 | Mousseau et al. | 709/206 |

\* cited by examiner

*Primary Examiner*—Nathan Flynn
*Assistant Examiner*—Mohammad A Siddiqi
(74) *Attorney, Agent, or Firm*—Berry & Associates P.C.

(57) ABSTRACT

A method and system for pushing electronic messages to a wireless device using an Internet NPS server with standard electronic mail interface. The NPS server, in one embodiment, mimics a SMTP mail server on the front end to generate pushed email notifications and pushed content packets in response to received emails addressed to a recognized device user. In one embodiment, the wireless devices receive notifications containing a subset of the email messages sent to the server and may alert the user when they are received. The NPS server functions to monitor the SMTP communication between its own mail server and the email sender to format a received email message into a 15 notification. The original email message is stored or its pathway recorded. Once received by the wireless device, the user may select the notification, causing the remainder of the corresponding email message to be wirelessly downloaded to the device.

17 Claims, 10 Drawing Sheets

METHOD AND SYSTEM FOR PUSHING ELECTRONIC MESSAGES TO A WIRELESS PORTABLE DEVICE USING A STANDARD MAIL SERVER INTERFACE

BACKGROUND OF THE INVENTION

1. Field of the Invention

The present invention relates to the field of electronic communication and data processing. More specifically, embodiments of the present invention relate to methods and systems for wireless communication of information including electronic mail messages and other data.

2. Related Art

As the components required to build a computer system have reduced in size, new categories of portable electronic devices and computer systems have emerged. One of the new categories is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer (calendar, datebook, etc.) and electronic notepads, to name a few. Palmtop computers with PIM software have been known as Personal Digital Assistants (PDAs). Many PDAs have a small and flat display screen associated therewith. Moreover, PDAs and cell phone technology are being integrated together resulting in a single intelligent device that provides wireless communication capability.

User convenience and device value are very important factors for portable electronic devices and systems that may include portable electronic devices. Typically, portable electronic devices are employed while the user is on the run, e.g., in business meetings, on business travel, personal travel, in a vehicle, on foot, etc. Because the user may be occupied or busy while using the portable electronic device, the number of user steps or user tasks required to access information from an electronic device (or to store information into the electronic device) is crucial for producing a commercially successful product. That is, the more difficult it is to access data from an electronic device, the less likely the user will perform those tasks to obtain the information. Likewise, the easier information is to obtain, the more likely the portable electronic device will be used to obtain that information and the more likely the portable electronic device will become a part of the user's everyday activities. Similarly, the more useful the device, the more the device will be used and acquired.

The portability and convenience of palmtops have made it increasingly desirable to increase the number and types of applications that can run on them. It is advantageous to expand the capabilities of a palmtop so that it can provide many of the same, if not the same, services provided by a desktop or laptop computer system, particularly with regard to access to the World Wide Web. As such, information currently available via the Internet using personal computers, such as on-line access to news and financial information, can also be provided via a palmtop. In addition, a palmtop can be used for electronic mail ("email") and multi-player gaming, and features such as voice recognition can also be added.

The modes of operation for obtaining email messages on a portable wireless device need to be improved. For instance, today, wireless device users employ a "pull" technique to obtain their wireless email and other messages and data. Using the pull technique, while in the off state, the user will raise an antenna on the wireless device, or otherwise power on the device, and an application on the device is invoked which connects the device to a server over a wireless communication network. The server is typically connected to the Internet. Once connected, the server checks if any email messages for the user have been received. If so, the user is given the opportunity to download the messages to the wireless device. If no messages are on the server, the user is given a message. The technique is a "pull" technique because the user needs to initiate the process to download the emails on each attempt.

Unfortunately, the processes are very time consuming of powering on the device, invoking the email message application, connecting to the server, the server checking for email messages and notifying the user. To exacerbate this situation, most often the user has no messages to download after performing the above time consuming pull process. This leads to user tedium. As a result, many users do not frequently perform the above pull process. What is needed is a more user convenient mechanism for users of wireless devices to receive email and other messages from a remote server.

In addition, when the server downloads an email message, the entire content of the message is received by the wireless device. Most wireless communication network companies charge the user by the amount of content transmitted over the wireless communication network. Therefore, if the user was not particularly interested in the email message, they are forced to pay for its download because the message was not able to be inspected until after it was entirely received. What is further needed is a mechanism for reducing the wireless communication costs of receiving email and other messages by a wireless device.

SUMMARY OF THE INVENTION

Accordingly, embodiments of the present invention provide a method and system to implement a more user convenient mechanism for users of wireless devices to receive email and other messages from a remote server. Also, embodiments of the present invention provide a mechanism for reducing the wireless communication costs of receiving email and other messages by a wireless device. It is appreciated that embodiments of the present invention provide the above advantages and others not specifically mentioned above but described in the sections to follow.

Described herein are a method and system for pushing electronic notification messages to a wireless portable device using a remote NPS (Notifications Proxy Server) server having a standard electronic mail interface or protocol (e.g., SMTP, POP, IMAP, etc.). In one embodiment, the NPS server may be located on the Internet. The NPS server, in one embodiment, mimics a standard SMTP mail server on the front end to generate pushed email notifications and pushed content packets in response to received email to a recognized device user. The email may be sent to the server over the Internet and then a subset of the message (e.g., a notification) can be forwarded to the device user over a wireless communication link, e.g., Mobitex, wireless LAN, Bluetooth, SMS, etc.

In one embodiment, the wireless devices continually receive these email notifications and may alert the user when they are received. The NPS server functions to monitor the SMTP communication between its own mail server and the email sender to format a received email message into a notification. The notification, converted into a small packet, contains only a subset of the original email message, e.g., containing the identification of the sender, the time, the date, the subject field, etc. Generally, the text of the body of the message and any attachments are stripped off to form the notification message. The original email message is also stored or its pathway recorded. Once received by the wireless device, the user may select the notification thereby causing the corresponding email message to be wirelessly downloaded to the device.

The NPS server also contains a user database which provides a mapping between the email address of the user and the address used by the wireless communication network for identifying the wireless device. In one embodiment, email messages sent to the user's email account on the mail server (within the NPS server) are stored there and then, provided the user is an authorized wireless device user, the email message is forwarded to the NPS server for wireless notification processing.

More specifically, an embodiment of the present invention is drawn to a communication system comprising: a plurality of wireless electronic devices operable to communicate over a wireless communication network; and a notifications server, coupled to the Internet and operable to communicate over the wireless communication network, the notifications server having a standard electronic mail protocol for receiving standard formatted electronic mail messages from the Internet; wherein the notifications server is for storing a received electronic mail message and is also for automatically generating, therefrom, a notification message which is a subset of the received electronic mail message; and the notifications server, upon generation of the notification message, for wirelessly transmitting the notification message to an identified wireless electronic device, of the plurality of wireless electronic devices, associated with a user that is the recipient of the received electronic mail message.

Embodiments of the present invention include the above and wherein the identified wireless electronic device is operable to display received notification messages to a user and wherein the identified wireless electronic device is operable to allow the user to select a particular received notification message and wherein the notifications server is also for wirelessly downloading the remainder of an electronic mail message corresponding to the particular received notification message in response to the selection thereof by the identified wireless electronic device.

DETAILED DESCRIPTION OF THE INVENTION

Figure 1:
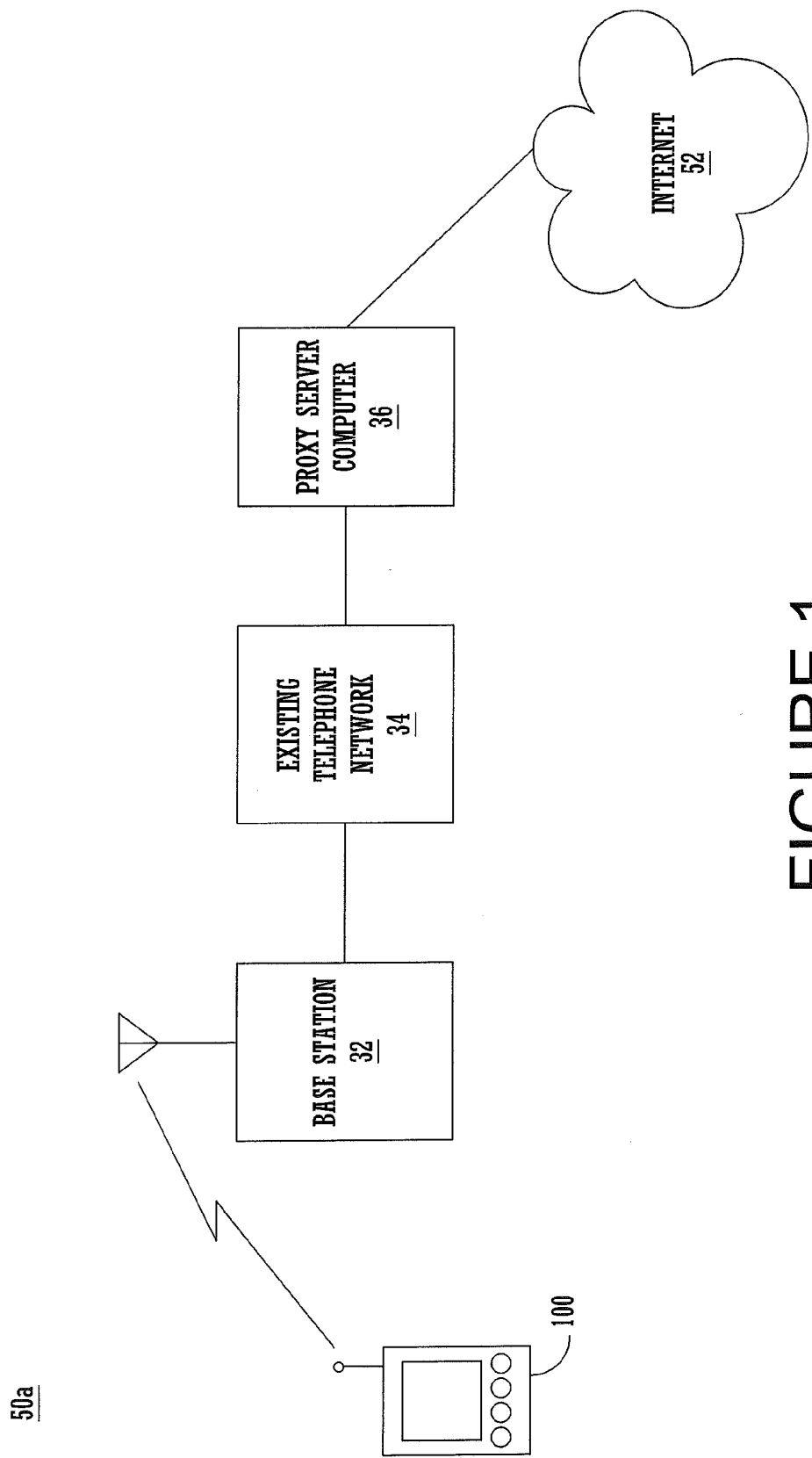
FIG. 1 is an exemplary networked system including a handheld computer system that is communicatively coupled to a web based server via a wireless connection without the use of a host computer system.

In the following detailed description of the present invention, a method and system for pushing electronic messages to a wireless portable device using an Internet server having a standard electronic mail interface, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions (e.g., processes 400 and 450) of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "accessing" or "processing" or "computing" or "suspending" or "resuming" or "translating" or "calculating" or "determining" or "scrolling" or "displaying" or "recognizing" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Portable Computer System Platform

The processes and systems of the present invention described herein are applicable to communication between wireless electronic devices which may include computer systems, portable computer systems, cell phones, pagers, etc. Some portable computer systems called personal digital assistants (PDAs) are handheld. Although applicable across a wide variety of platforms and devices, an embodiment of the present invention is described herein by example using an exemplary portable or mobile computer system, e.g., a PDA. Additionally, one example of the present invention is described with respect to receiving, formatting and transmitting electronic mail (email) messages. It is appreciated that the embodiments of the present invention apply to the transmission of any type of information or message and that email messages are shown as just one example.

FIG. 1 is a block diagram of an exemplary network environment 50a including a handheld computer system 100. In one embodiment, portable computer system 100 has the ability to transmit and receive data and information over a wireless communication interface (e.g., a radio interface) including email message notifications as described herein.

Base station 32 may be both a transmitter and receiver base station, which can be implemented by coupling it into an existing public telephone network 34. Implemented in this manner, base station 32 enables handheld computer system 100 to communicate with a proxy server computer system 36, which is coupled by wire to the existing public telephone network 34. Furthermore, proxy server computer system 36 is coupled to the Internet 52, thereby enabling handheld computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that one of the functions of proxy server 36 is to perform operations over the Internet 52 on behalf of handheld computer system 100. For example, proxy server 36 has a particular Internet address and acts as a proxy device for handheld computer system 100 over the Internet 52. As described more fully herein, the proxy server 36 may include or be in communication with a NPS 210 server (Notifications Proxy Server) in accordance with embodiments of the present invention.

It should be further appreciated that other embodiments of a communications network, planned or envisioned, may be utilized in accordance with the present invention. For example, a wireless connection may be made from handheld computer system 100 directly to the Internet 52.

The data and information which are communicated between base station 32 and handheld computer system 100 are the same type of information and data that can conventionally be transferred and received over a public telephone wire network system. However, a wireless communication interface is utilized to communicate data and information between handheld computer system 100 and base station 32. It should be appreciated that one embodiment of a wireless communication system in accordance with the present invention is the Mobitex wireless communication system. Alternatively, a wireless GSM network, a wireless LAN network, or a wireless Bluetooth network may be employed.

Figure 2A:
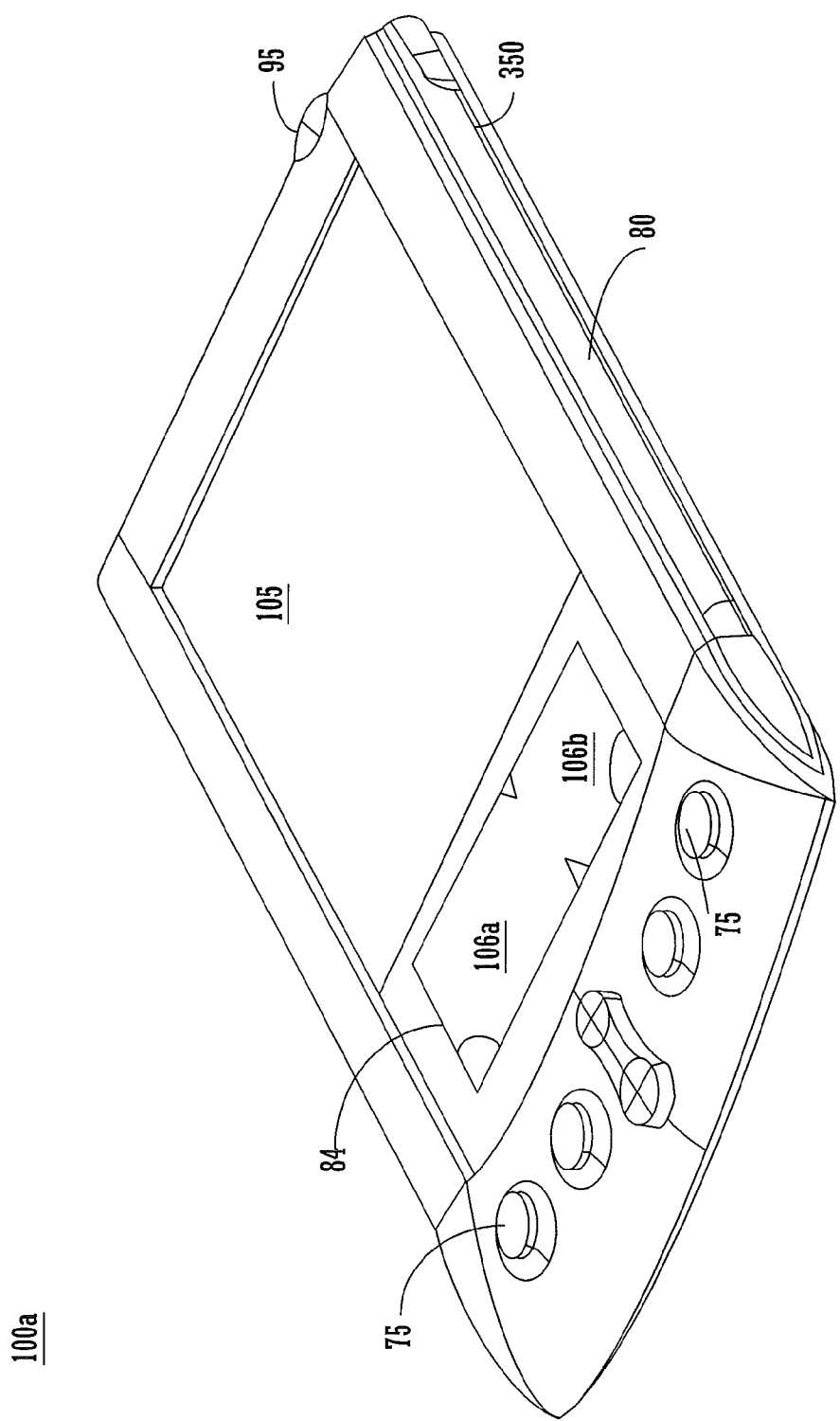
FIG. 2A is a top side perspective view of the exemplary portable computer system.

FIG. 2A is a perspective illustration of the top face 100a of one exemplary embodiment of a handheld computer system. The top face 110a contains a display screen 105 surrounded by a bezel or cover. A removable stylus 80 is also shown. The display screen 105 contains a transparent touch screen (digitizer) able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. The top face 100a also contains one or more dedicated and/or programmable buttons 75 for selecting information and causing the computer system to implement functions.

Other buttons (icons) can be implemented within a silk screen layer material 84 on which regions 106a and 106b reside. An exemplary on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition.

Figure 2B:
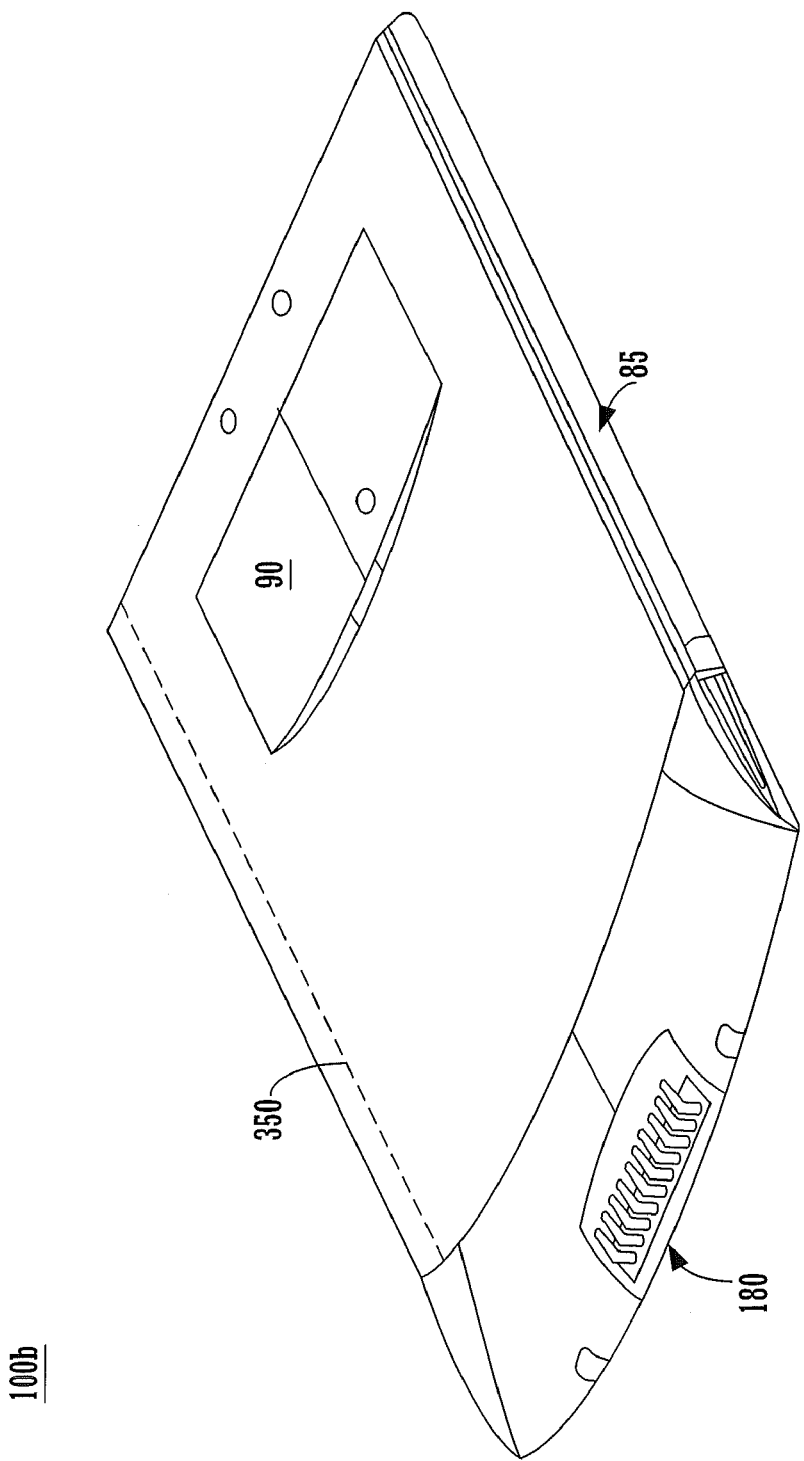
FIG. 2B is a bottom side perspective view of the exemplary portable computer system.

FIG. 2B illustrates the bottom side 100b of one embodiment of the palmtop computer system. An optional antenna 85 is shown and also an optional battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350. It is appreciated that the portable computer system is able to receive notifications from the NPS 210 server generally at any time, e.g., while turned on or off.

Figure 3:
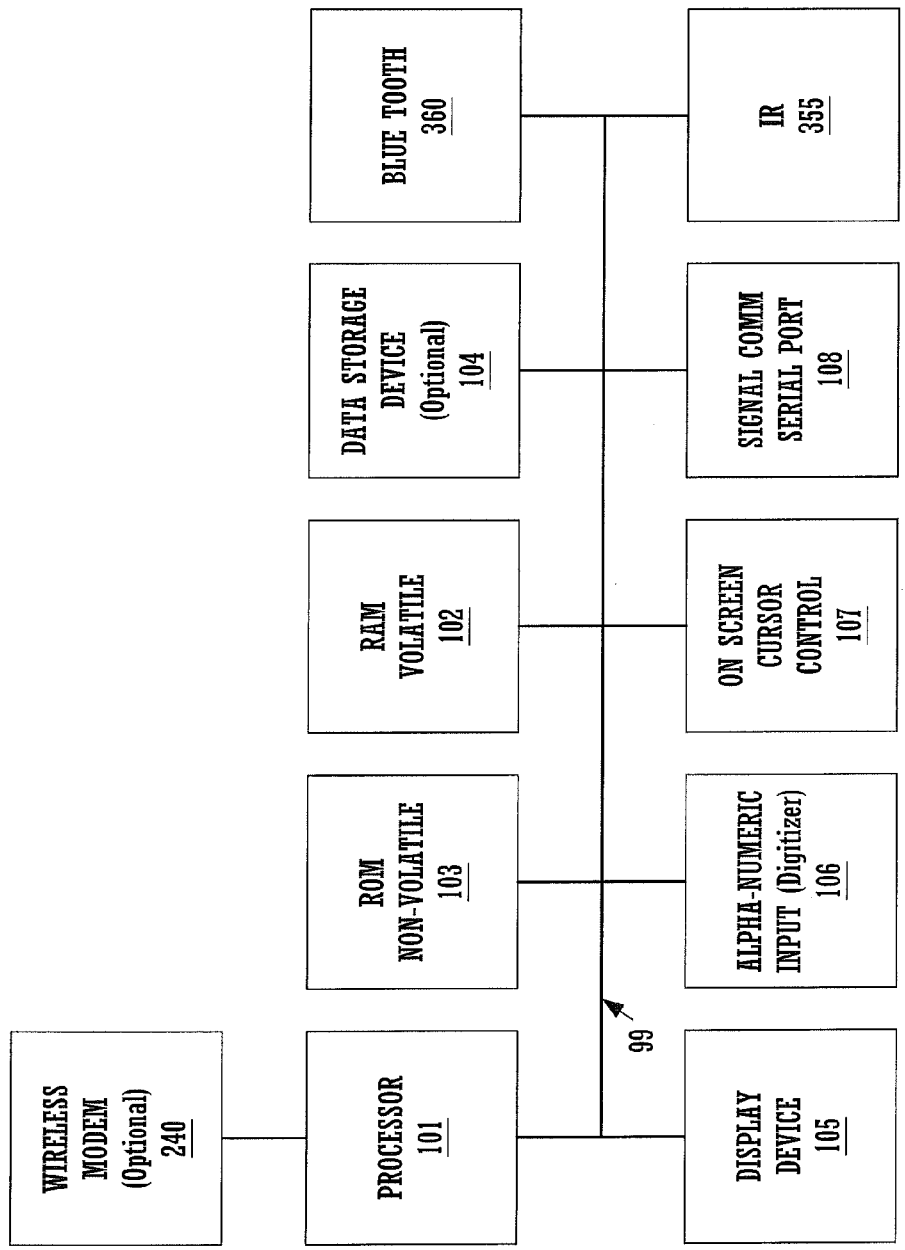
FIG. 3 is a logical block diagram of an exemplary handheld computer system in accordance with an embodiment of the present invention.

FIG. 3 illustrates exemplary circuitry of portable computer system 100. Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., thin profile removable memory) coupled with the bus 99 for storing information and instructions. Device 104 can be removable. As described above, system 100 also contains a display device 105 coupled to the bus 99 for displaying information to the computer user.

Also included in computer system 100 of FIG. 3 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101.

System 110 also includes an optional cursor control or directing device 107 coupled to the bus for communicating user input information and command selections to the central processor 101. In one implementation, device 107 is a touch screen device (also a digitizer) incorporated with screen 105. Device 107 is capable of registering a position on the screen 105 where the stylus makes contact and the pressure of the contact. The digitizer can be implemented using well known devices, for instance, using the ADS-7846 device by Burr-Brown that provides separate channels for spatial stroke information and pressure information.

The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Any of a number of display technologies can be used, e.g., LCD, FED, plasma, etc., for the flat panel display 105. In one embodiment, the display 105 is a flat panel multi-mode display capable of both monochrome and color display modes.

Signal communication device 108, also coupled to bus 99, can be a serial port (or USB port) for communicating with the cradle 60. In addition to device 108, wireless communication links can be established between the device 100 and a host computer system (or another portable computer system) using a Bluetooth wireless device 360, an infrared device 355, or a GSM radio device 240. Device 100 may also include a wireless modem device 240 and/or a wireless radio, e.g., a GSM wireless radio with supporting chipset. The wireless modem device 240 is coupled to communicate with the processor 101 but may not be directly coupled to port 108. In one implementation, the Mobitex wireless communication system may be used to provide two way communication between system 100 and other networked computers and/or the Internet via a proxy server. In other embodiments, TCP protocol can be used or SMS (Short Message Service) can be used.

Notifications Proxy Server of the Present Invention

A function of the NPS 210 (Notifications Proxy Server) server in accordance with embodiments of the present invention is to provide wireless device users with electronic mail ("email") notifications and network administrators with "push" capabilities. Notifications and general "push" rely on a proxy server in order to optimize performance and throughput on wireless networks. As described herein, notifications and "push" content may be optionally compression formatted for low bandwidth connections and in order to provide good wireless performance.

Figure 4:
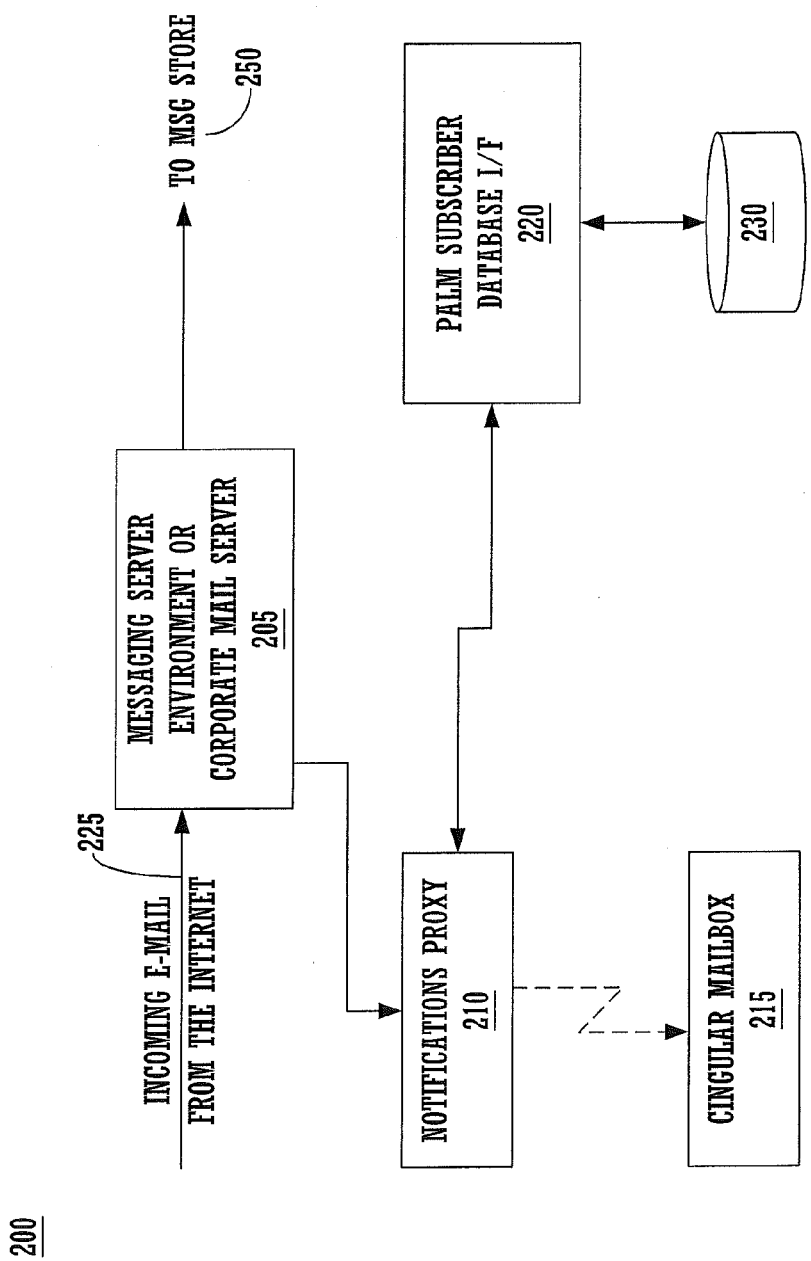
FIG. 4 is a logical block diagram of the NPS sub-system in accordance with an embodiment of the present invention.
Figure 5:
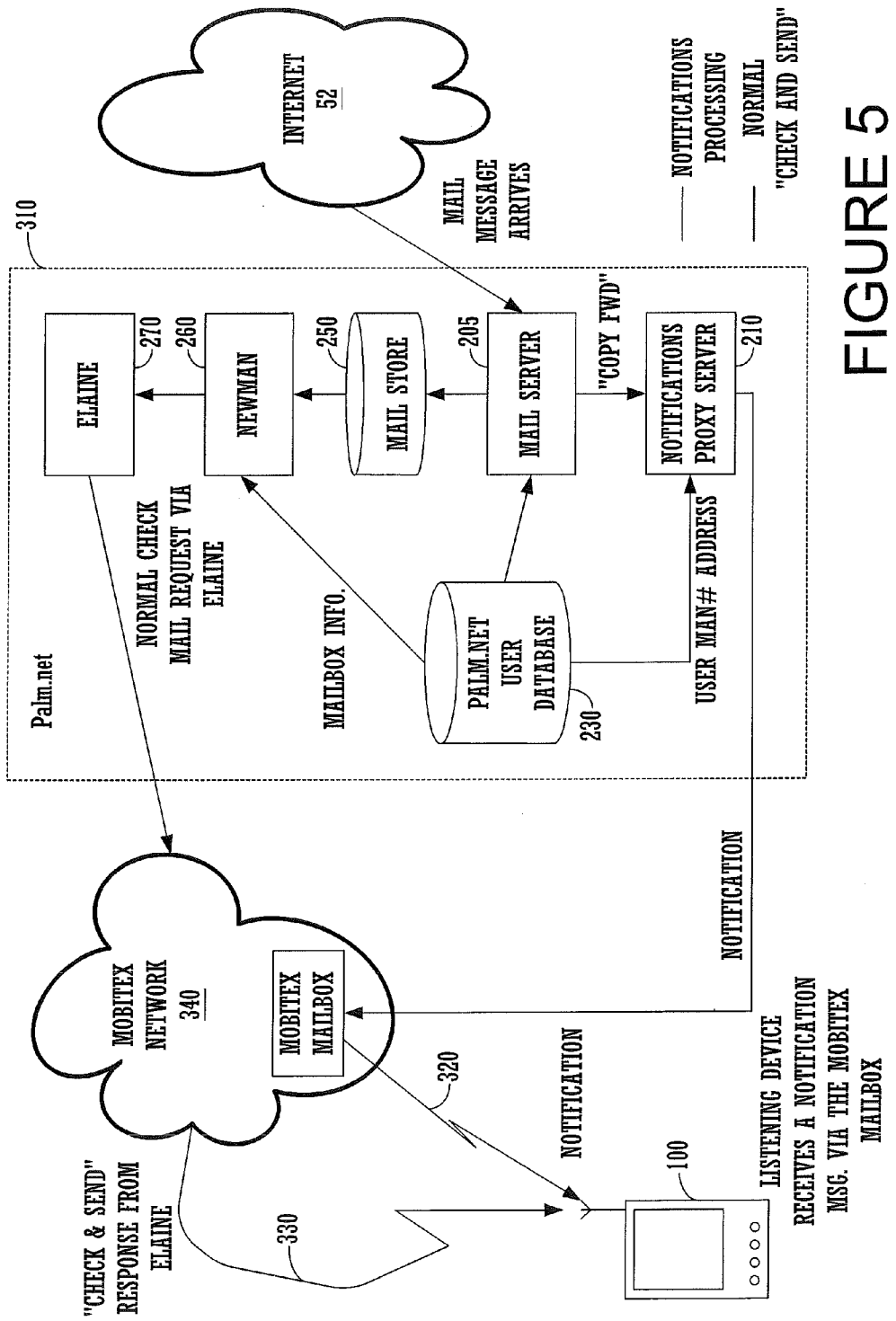
FIG. 5 is a diagram of the notifications push server architecture in accordance with an embodiment of the present invention.

FIG. 4 illustrates a sub-system architectural overview 200 of a communication system including the NPS 210 server of the present invention. Also, FIG. 5 illustrates a diagram of the notifications push server architecture in accordance with an embodiment of the present invention. The NPS 210 server interlaces with the Internet 52 such that it provides a standard email protocol for accepting standard formatted email messages. This is performed using a messaging server 205. Generally, received email messages are copied by the mail server 205, and one copy is forwarded to the message store 250 while the other copy is forwarded to the NPS 210 server of the present invention.

In response to receiving the email message, the NPS 210 server functions to generate a notification message (notification) that is a subset of the received email message. The notification message is designed to fit within a small packet, e.g., less than 500 bytes, to be wirelessly transmitted to an identified wireless electronic device over a wireless communication network 340. The network 340 may be any wireless communication network, e.g., Mobitex, wireless LAN, Bluetooth, etc. It is appreciated that the notification is transmitted using a "push," technology, e.g., it is generated and transmitted in response to the incoming email message 225 received by the mail or messaging server 205.

The received notification may be used by the wireless electronic device to cause the remainder of the email message to be downloaded wirelessly to the wireless electronic device. A client database 230 and interlace 220 (LDAP) is used to provide a mapping between the email addresses received and the identifications required to locate or address a particular wireless electronic device.

The messaging server 205 may use standard "off the shelf" mail server components that supports the IMAP, POP, and SMTP Internet protocols, although any mail server can be used since the interface to the NPS 210 uses a standard SMTP protocol. The mail server 205 may accept mail from anywhere but in one embodiment it accepts incoming mail from the Internet, e.g., via the firewall. In turn, another system 260 (FIG. 5) reads mail out of the mail server store 250 (FIG. 5) when it receives an appropriate "check and send" request from a device sent via Elaine 270 (FIG. 5).

If necessary, multiple mail servers can be used. Multiple servers are currently configured in the database directory 230 used by both it and system 260. This is done so that the mail server 205 knows which server to access for a particular user. This same interface can be enhanced to support multiple NPS 210 processes for notifications and "push."

In one embodiment, the messaging server 205 environment may consist of a matrix of Netscape messaging servers, each configured to perform a separate mail function. However, the Netscape servers may be replaced by another mail server. Herein, the term "server group" refers to a single logical object. It is appreciated that any mail server can be used to provide the NPS 210 with its input stream via its ubiquitous "copy forward" and SMTP protocol requirements.

The system diagram of FIG. 4 shows a generalized overview of the current NPS 210 architecture 200. It is appreciated that there may be a single NPS 210 process per messaging server (nodes) and this will talk to one or more database servers and also to many target Cingular mailboxes (e.g., mailboxes of particular wireless electronic devices).

As illustrated in FIG. 4, the NPS 210 provides the necessary translation, compression, and load distribution services that are required to deliver notifications between the mail servers 310 and the wireless network 340. In one embodiment, the NPS 210 will be a stateless server in that it generally maintains no state information between or among individual user notifications or separate "pushed" messages. This stateless design simplifies the implementation of the NPS 210 and provides maximum robustness and fail-over capabilities. It also creates a simpler architecture with easy scalability realized by simply adding more NPS 210 machines in parallel.

The NPS 210 architecture 200 requires that the mail server 205 message forwarding configuration be modified to send notification initialization (NI) message to the NPS 210 process. This is accomplished via the "copy forward" user setting. Importantly, to a mail server or client, the NPS 210 appears to be nothing more than another mail server receiving a forwarded copy of a message via the standard protocol, SMTP. The NPS 210 treats processed SMTP session messages received via SMTP as NI messages.

This "NI message" is viewed as a mail request to the NPS 210 process to notify a wireless device 100 user that mail has arrived in that user's inbox 215. These requests generally always succeed in that the NPS 210 makes an attempt to notify the users device 100. The NPS 210 makes an effort to deliver all received NI requests. Failure to deliver a notification or page however is considered to be a non-critical error since the NPS 210 cannot guarantee delivery due to the specific architecture of push.

In one embodiment, the NPS 210 is notified of each incoming mail message so that it can generate a new notification message for a user over wireless path 320. In one implementation, device users receive notification messages from the NPS 210 by default. Each user has an LDAP (user database 230) setting that controls push delivery and may be adjusted.

The main functional blocks of the NPS 210 subsystem 200 are designed so that scalability may be achieved by adding machines in parallel. In this way, an NPS 210 server can start out as merely one or two machines and can grow as more machines are added when user requirements and traffic grow.

Figure 6:
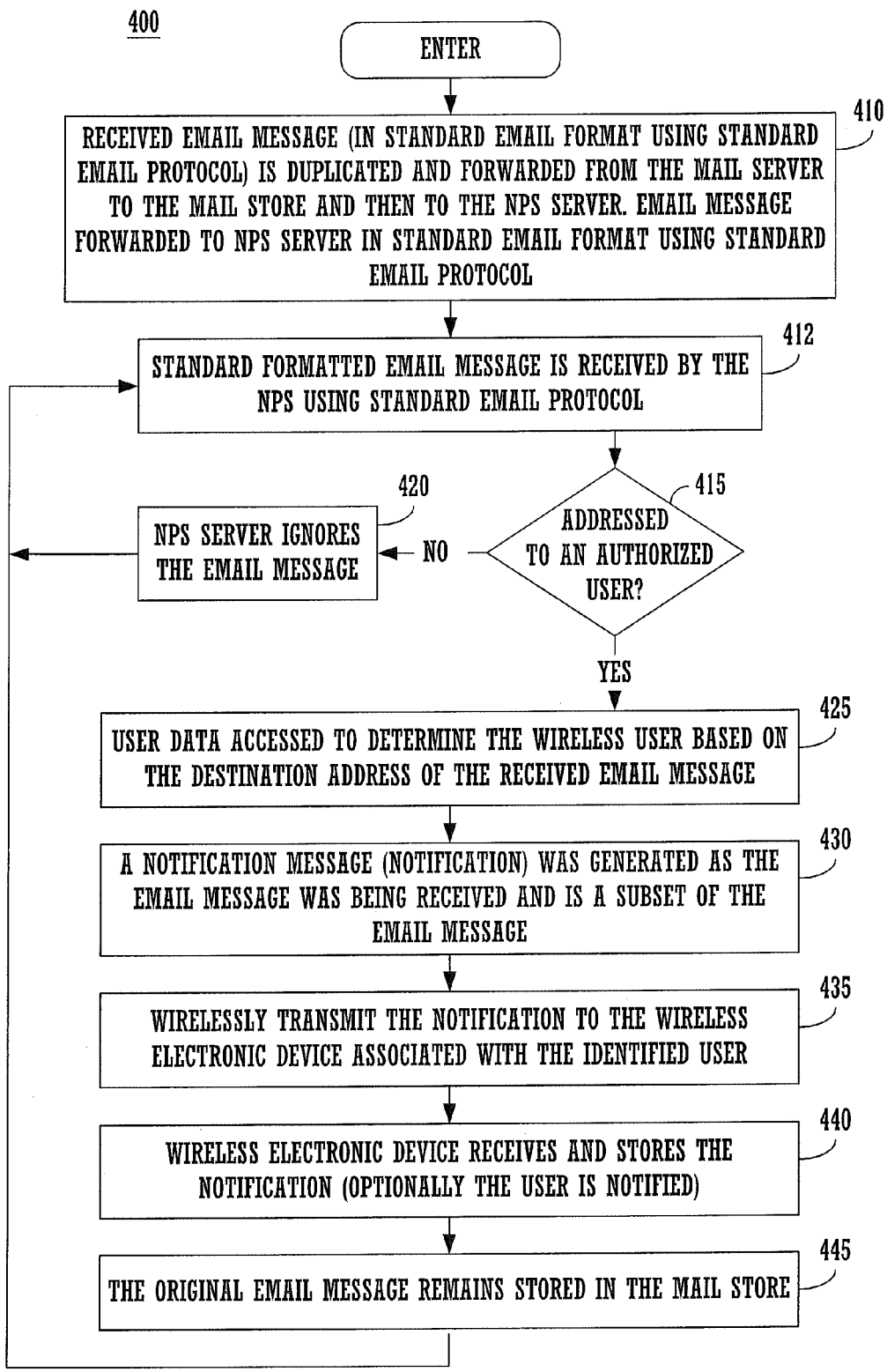
FIG. 6 is a flow diagram illustrating steps performed by the NPS server of the present invention in response to receiving an email message over the Internet.

Overview of NPS 210 Processing. FIG. 6 is a flow diagram illustrating steps of the NPS 210 process 400. At step 410, an incoming email message (of a standard email format and using a standard email protocol, e.g., SMTP, POP, IMAP, etc.) is received by the mail server 205 and duplicated. A copy is sent to the mail store 250 and a copy is sent (in a standard email format and using a standard email protocol, e.g., SMTP, POP, IMAP, etc.) to the NPS 210 server. The email message is received by the NPS 210 at step 412. On receiving an NI message via SMTP, the NPS 210 immediately replies to the messaging server 205 that the notification request (or forwarded message) had been successfully received. The NPS 210 then, at step 415, accesses the user database 230 to check if the recipient of the email message is an authorized user. If the user is not authorized for wireless device communication, then the email message may be ignored, step 420. User information is checked and authorization is performed based on the user database 230 and interface 220.

At step 425, the NPS 210 server converts the user name of the email address to an identifier that can be used to communicate to the appropriate wireless electronic device. The user name is converted to a Cingular address. The NPS 210 server generates (step 430) a notification packet as the email message is being received. The notification message is a subset of the received email address and includes an identifier of the sender, a subject field, and optionally date and time information. At step 435, the notification message is packetized and pushed wirelessly into the user's Cingular mailbox of the identified wireless device which receives and stores the notification message (step 440). As shown by step 445, the original email message is retained in the mail store 250.

The messaging and NPS 210 systems utilize a global directory service provided by the database servers 220/230. These servers have subscriber data which maps a network specific user ID to a particular user, including their mail address, mail server, IMAP mailbox, and other mail account information. This same database is also being used by the messaging server 205. The NPS 210 is also capable of receiving a network address as part of a "push request."

The subscriber database 220/230 is a repository of machine-specific configuration information. In addition, the NPS 210 server's configuration information may be both locally contained in a Registry and in the LDAP directory 220/230. This information is described further below.

Figure 7:
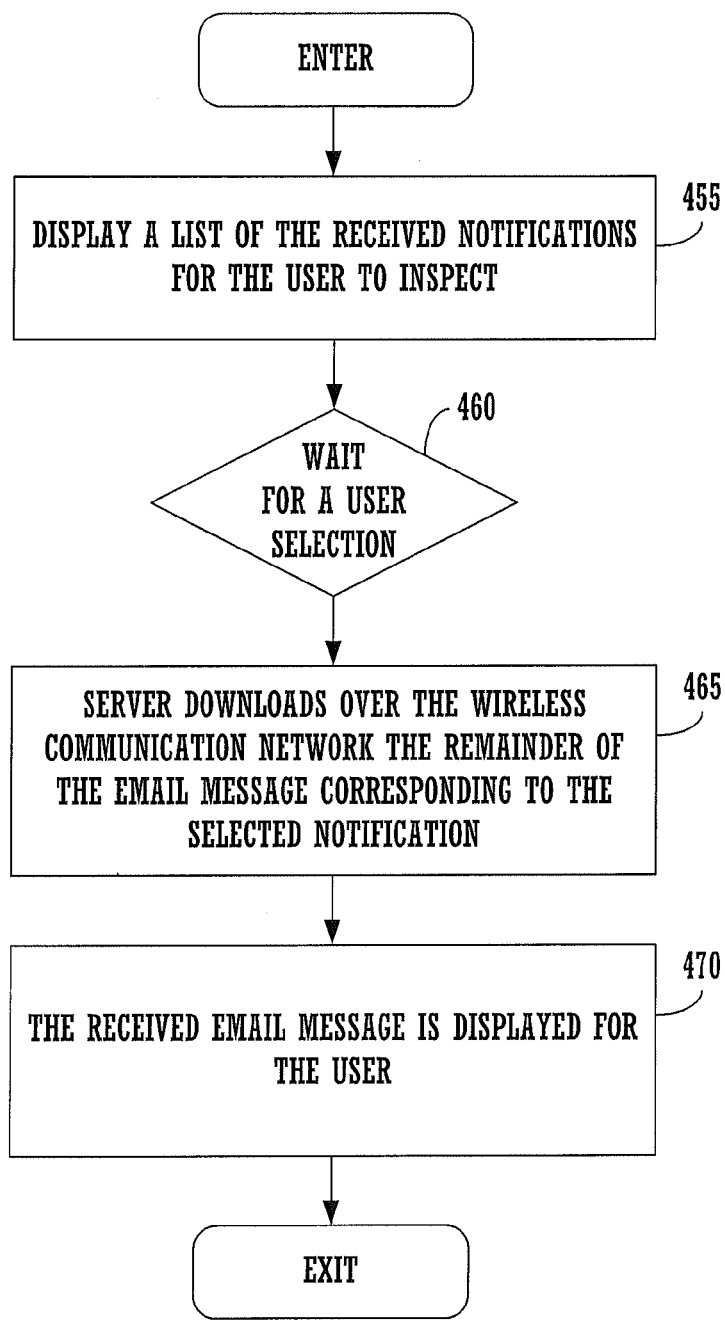
FIG. 7 is a flow diagram illustrating steps performed by a wireless electronic device in response to a user selecting notifications.

FIG. 7 illustrates a process 450 on the wireless electronic device. At step 455, the device may display a list of all received and unread notifications from the NPS 210. The user is allowed to make a selection of a particular notification at 460. At 465, the NPS 210, notified of the request, then downloads the remainder of the email message that corresponds to the selected notification (path 330, FIG. 5). At step 470, the received email message is then displayed on the wireless electronic device.

Notification Initialization (NI) Message Generation. Using the normal mail forwarding mechanism common to all mail servers to target the NPS 210, the NPS 210 appears to be a normal SMTP receiver. All messages for subscribed users are routinely forwarded to the NPS 210. The NPS 210 interacts with a mail server 205 just like any other SMTP server receiving forwarded mail. The NPS 210 treats the resulting request as a NI message.

This approach has many advantages. First, no special programming is necessary in the mail server environment. Secondly, mail server independence is promoted because this mechanism could easily be adapted to use any mail server since the forwarding option via SMTP is ubiquitous. Third, ease and speed of implementation are promoted. Lastly, the granularity of notifications message generation and arrival is closer to being real-time. The mechanism supports the basic requirement of alerting the NPS 210 to the arrival of a message for a particular user. The basic processing that the NPS 210 needs to then perform is relatively unchanged.

It is appreciated that the NPS 210 does not modify the data it receives, it rather routes and then filters through the relevant portions of a message. In one embodiment, the NPS 210 may be implemented in C++ as a Windows NT server, however, many alternative designs may be practiced.

Figure 8:
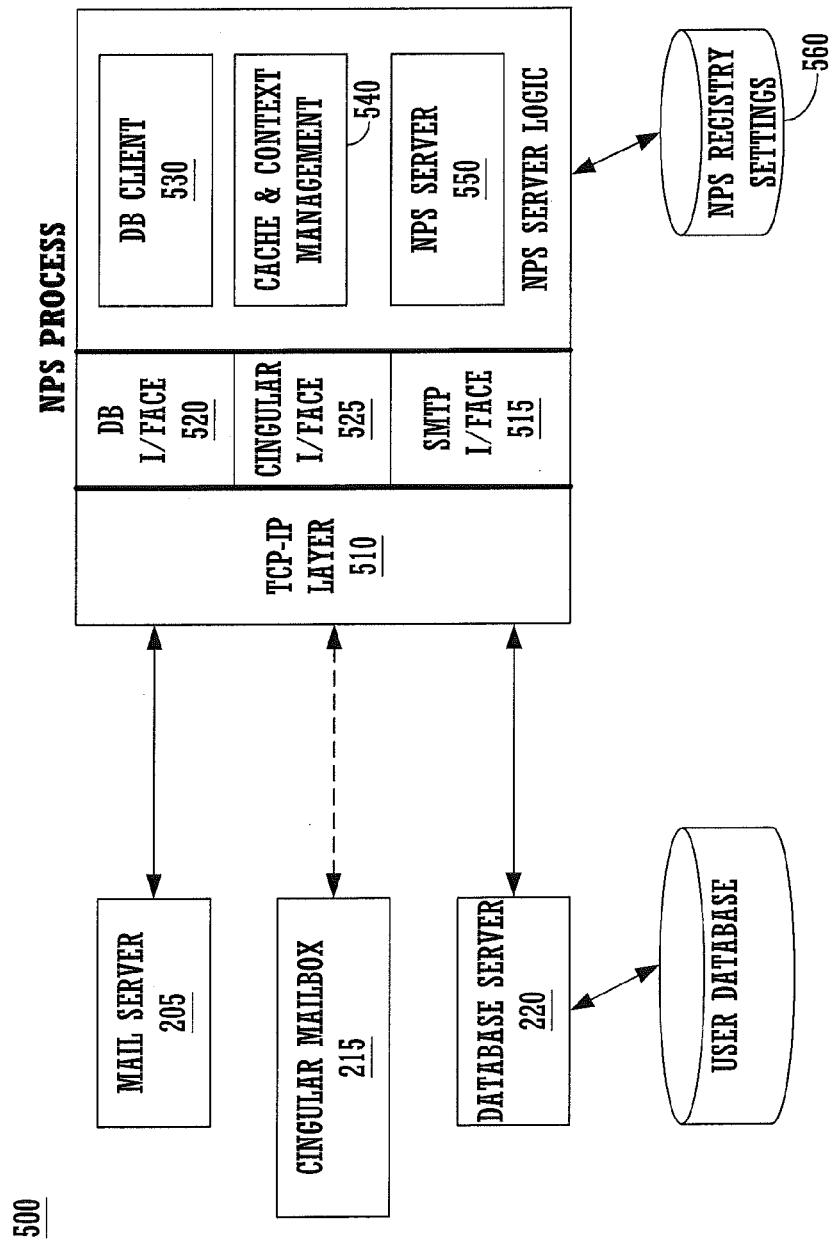
FIG. 8 is a diagram of the main objects of the NPS process architecture in accordance with an embodiment of the present invention.

The diagram of FIG. 8 shows the proposed internal components of an NPS 210 process 500 in greater detail. The NPS 210 process 500 contains a TCP-IP layer 510, a database interface 520, a Cingular interface 525, a SMTP interface 515, a database client 530, a cache and context management 540 and the NPS server 550. An asynchronous object oriented approach may be adopted for most low-level NPS 210 functions.

The following sections describe the various NPS sub-system components in greater detail under the headings: NPS SMTP Communications Layer Interactions; NPS Server Overview; NPS Database Layer Interactions; NPS Worker Thread Context; NPS Global Context Management; NPS Cingular Interactions; NPS Design Discussion; NPS Telnet Interface; SMTP Interface; and Registry Based Settings.

NPS SMTP Communications Layer 515 Interactions. This description provides an outline of the manner in which the NPS 210 utilizes its SMTP/mail-server communications layer. From the perspective of the mail server 205, the NPS 210 appears to be just another SMTP server with an open listening port. The NPS 210 therefore supports a limited subset of the RFC 821 protocol as is required by mail-server forwarding. The mail server configuration may be altered to point to the NPS 210 as a forwarding destination for users who subscribe to receive notifications or "pushed" content.

The SMTP server communications layer may be abstracted in such a way that it may become a removable and reusable C++ language component. SMTP messages are exchanged in a conversational manner and the NPS 210 may run multiple threads to improve performance. Message exchanges may take place within the context of SMTP sessions. The NPS 210 may follow the normal SMTP server conversational sequence as shown in Table I below:

TABLE I

| | |
|---|---|
| I. | Identify itself by announcing its domain name. |
| II. | Receives the e-mail identifier of the originator. |
| III. | Receives the e-mail identifier of the recipient. |
| IV. | Receives a DATA command. |
| V. | Receives the message headers. |
| VI. | Receives an empty line followed by the message text. |
| VII. | The message terminates with a single line consisting of a period |
| VIII. | followed by <CR> <LF> characters. |

The command and reply model is similar to that used by FTP and other TCP-IP protocols. All messages sent by the NPS 210 to the mail server 205 start with a reply number. The SMTP mail tokens received from the mail server may be enclosed in angle brackets (e.g., <rwl@palm.net>).

The end of the message text is identified by a line containing a single period. (If the user is actually trying send a line with a single period as part of the text then an additional period is inserted by the server and this should be deleted by the NPS 210.)

An example of a typical SMTP exchange is shown below in Table II.

TABLE II

| R: | 220 NPS 210.PALM.NET Simple Nail Transfer Service Ready |
|---|---|
| S: | HELLO PALM.NET |
| R: | 250 NSP.PALM.NET |
| S: | MAIL FROM:<Smith@AOL.COM> |
| R: | 250 OK |
| S: | RCPT TO:<Jones@PALM.NET > |
| R: | 250 OK |
| S: | RCPT TO:<Green@PALM.NET> |
| R: | 550 No such user here |
| S: | RCPT TO:<Brown@ PALM.NET> |
| R: | 250 OK |
| S: | DATA |
| R: | 354 Start mail input; end with <CRLF>.<CRLF> |
| S: | Any text here . . . |
| S: | . . . etc. etc. etc. |
| S: | . |
| R: | 250 OK |
| S: | QUIT |
| R: | 221 NPS 210.PALM.NET Service closing transmission channel |

In one embodiment, the NPS 210 supports the minimum RFC 821 functions required by typical mail-server forwarding (e.g., SMTP functions that are NPS 210 inappropriate such as RELAY may not be supported and should the mail server invoke such a function then the NPS 210 will reply "OK.")

R: 250 OK

The NPS 210 will log any errors and continue.

NPS 210 Database Layer 520 Interactions. An outline of the manner in which the NPS 210 utilizes the NPS-database layer 520 is described. From the perspective of the database server 220, the NPS 210 appears to be yet another client. The messaging system relies on a reference directory service provided by the subscriber database servers 230.

These subscriber database servers 230 map a network specific user ID to a particular device user, including their mail address, mail server, IMAP mail box, and other mail account information. The same database is also used by the messaging and Newman servers (and others). The messaging server information contained in the directories may be messaging server vendor specific.

The subscriber database servers 230 are also a repository of machine-specific configuration information. Except for notifications settings and user details, the NPS 210 maintains its operating system-specific configuration information in a registry. The NPS 210 uses the subscriber information to get the wireless network details required to deliver a notification or "pushed" message to a user's Cingular mailbox 215.

NPS 210 Server Requirements. The NPS 210 may be implemented in on any computer platform, but in one embodiment it may be implemented as a Windows NT 4.0 operating system running on x86 processors. It may be constructed as a service application which is a special type of application designed to be automatically launched by the operating system at boot-up time and regardless of which user is logged in. In another embodiment, it may be ported to become a UNIX Daemon process.

In one implementation, the NPS 210 is a context-free multi-threaded server process. The NPS 210 normally may be configured as an operating system service and started automatically by the system at system boot time. For debugging and testing purposes the NPS 210 can be run as a simple Win32 process (for instance).

Once installed onto a machine, the NPS 210 can be manually started and stopped using the standard mechanism provided on any operating system for starting and stopping services. These include the services control panel applet and the "net" command line program. In addition, NPS 210 may be configured to start up automatically during boot or manually through the services control panel applet. NPS 210 normally runs as a window-less background task without a graphical user interface. The NPS 210 be required to report any errors it encounters through the operating system event logging facility.

If the NPS 210 encounters a major problem during startup or run-time operation, it will log one or more events to the operating system's event logger and these events can be later viewed using the operating system's event viewer application. Should the NPS 210 completely fail due to a system level exception or similar problem it will dump the contents of its stack using the stacktrace routine.

In an alternative embodiment, another version of the NPS 210 may also implement an SNMP agent that makes the set of global NPS 210 SNMP variables available to the SNMP service. With this facility, any remote SNMP monitoring station can monitor the NPS 210 context variables.

Figure 9:
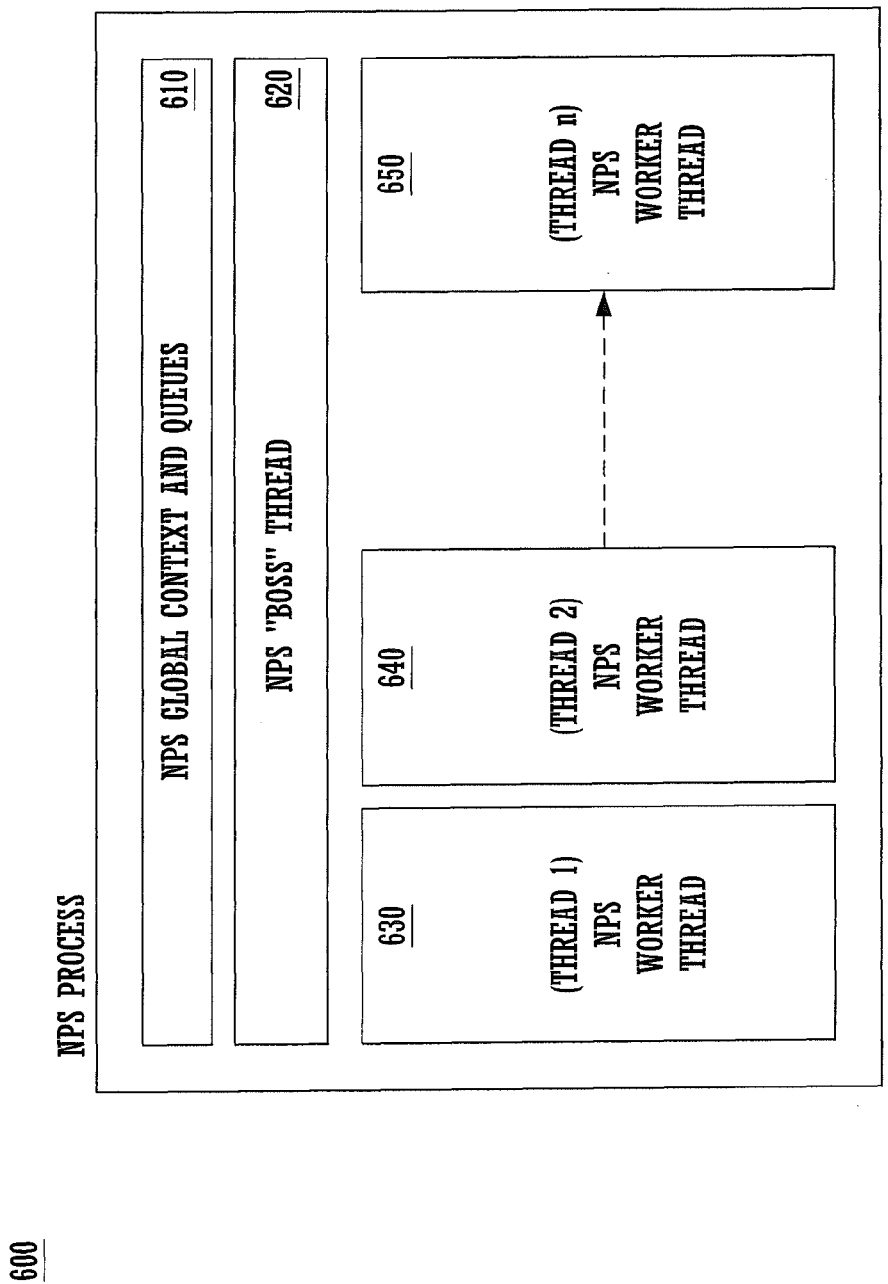
FIG. 9 is a process thread overview of the NPS server in accordance with one embodiment of the present invention.

FIG. 9 illustrates an overview the NPS 210 process thread environment 600 of one embodiment of the present invention. The NPS 210 virtual server can consist of a central (NPS 210) dispatcher thread and several queue management objects. As NI requests arrive, the dispatcher adds them to an internal NI "get-work" queue. Worker threads are initially spawned to handle incoming requests up to a configured NPS 210 worker thread maximum setting. Further requests are asynchronously queued utilizing an operating system's I/O completion port architecture, in one embodiment.

It is appreciated that this architecture allows for high performance without resorting to a one thread per client architecture which would otherwise degrade system performance during periods of high demand.

At peak rates of demand, the incoming NI requests may be virtually queued 610 until worker threads 630, 640, 650 become available. Should the NPS NI queue 610 exceed predetermined configured limits, the NPS 210 may refuse to accept new work items until the queued list has once again dropped below the configured threshold. In this way the NPS 210 self regulates its throughput and avoids crashing. The NPS 210 configuration settings 560 (FIG. 8) may be contained in a registry. NPS 210 worker threads each temporarily manage a mini context stack on the heap for each in-progress NI request.

NPS Worker Thread Context. NPS worker threads receive SMTP messages from the mail server as forwarded mail messages. The SMTP protocol is a "chatty" protocol and the transfer of each message involves several TCP-IP message exchanges. As a message (NI request) is delivered piece by piece, the dispatched worker thread builds up and caches a context object for the request containing the message and several other state flag indicators. On successful completion of the message delivery, the worker thread reports "success" to the messaging server to allow it to continue processing other incoming messages. The worker thread then begins to process the request by accessing the recipient's database information.

In one implementation, the database details are used to determine a users MAN# (Mobitex Access Number) and other Cingular details for delivery of the formatted notification message to a user mailbox.

In one embodiment, the worker thread formats the message by extracting the "from," "date" and "subject" information and generally discarding the rest of the data. The message may also contain optional delivery fields identified by special NPS tokens. On completion of the Cingular delivery, the context information may be discarded and the worker thread may retrieve the next work item. Should Cingular fail to respond within the configured timeout period, the worker thread logs the error and retrys the Cingular delivery.

If after several attempts to deliver the message, the worker thread is still failing to deliver a particular notification message, then the worker thread may then discard the message, log the failure and continue with the next work item.

NPS Global Context Management. The NPS process of the present invention deals with context information at two levels. At the highest level, the global memory of the NPS process contains certain global information and status indicators for management of the NPS process itself. These include (but are not limited to) the following context data items: NPS State Indicator; NPS Version Information; Number of Worker Threads; Status of each Worker Thread; and Queue status.

The worker-thread context data contains all of the information for a particular client request. The global NPS context area contains the status of worker threads, NPS status and queue information. In addition, the global context area contains NPS thread synchronization information.

Every connected client's request is served in the NPS 210 by a pool of worker threads. Each NPS worker thread retrieves request context information and becomes responsible for completing an asynchronous step before servicing the next work item (NI request). This is a standard approach to a high-performance asynchronous multi-threaded server.

NPS 210 Cingular Interactions. As described above, the NPS 210 provides the necessary formatting, and load distribution services that are required to interact with the Cingular network and the user's device. The NPS 210 connects with the wireless network using any of a number of well known protocols available today, e.g., as in the ELAINE system, as one example.

NPS 210's major role is to take NI requests that arrive from the messaging server 205, process the requests using the user's database address and then forward notification or "pushed" messages to the wireless network and that users Cingular mailbox. The users network address is the Cingular MAN#, in one implementation.

NPS Design Discussion. In overview, the present invention adds push technology to the messaging environment. Notifications may be delivered to a client on a "subscription basis" and the mechanism may be likened to telemetry. In addition, the architecture of the present invention is scalable since multiple NPS processes can be distributed across a network (at least as scalable as the messaging server environment). Additionally NPS processes can be easily configured to interact with different messaging server processes. The NPS process gets the configuration information used to link to the mail server 205 and Cingular from the local registry. These details allow the notifications architecture to scale and also lend it an improved level of fault tolerance.

In one embodiment, the NPS 210 acts as both a virtual client and as a virtual server in the Cingular and mail server interfaces.

The NPS process of the present invention caches requests on behalf of the messaging client and it generally never accepts more requests than it can handle. The NPS 210 stores any overflow up to a point but will log this as a serious error which should be an indication to a network administrator to increase the number of NPS servers.

The NPS 210 has the task of forwarding notifications and "push" messages to wireless device clients. The NPS 210 carries most of the burden of forwarding incoming mail notifications from the Internet, converting them to a useable client format, and then transferring them to the client over the wireless network. The client software, by comparison, simply polls the Cingular mailbox and then displays the received data on the screen (FIG. 7).

The design of the NPS 210 is important to the performance of the messaging environment. The NPS 210 therefore should be able to adequately service thousands of users without introducing substantial delays to the messaging system. The NPS 210 design also should be scalable so that a larger number of users can be supported.

Another attribute of the NPS 210 is that it is a completely stateless design. In general, a stateless design is more tolerant of communication and protocol errors than a state dependent design. A stateless design is also easier to implement and manage, especially with a large network of distributed servers. For example, with multiple distributed servers, a state dependent design would have to share state from one server to another if a user happened to temporarily move to a different region or if one of the servers went down for any reason.

NPS Telnet Interface. Optionally, an NPS telnet interface may be provided for system administration and debugging purposes. Using any standard telnet client software, a system administrator can connect to the NPS telnet port and issue text based commands to the running NPS 210 server.

Using this optional feature, the NPS 210 can support a number of text commands for changing its configuration, checking status, displaying trace information, testing connectivity, etc.

SNMP Interface. An optional SNMP interface (515 FIG. 8) or agent is the component of the NPS 210 that enables remote monitoring using any standard SNMP monitoring station. Using SNMP, a remote station can query the current configuration of the NPS 210, its performance statistics and even initiate a restart of the NPS 210 service.

Registry Based Settings. The Registry 560 (FIG. 8) is a set of files in an operating system directory that contain the registry database for all applications. The NPS server 550 will get its configuration settings only from the registry. These include the network addresses and other non-database configuration settings that the NPS 210 acquires. As with other applications and services, NPS 210's registry settings can be edited by using standard programs that are provided with the operating system.

In one implementation, the configuration parameters for NPS 210 may be located under the registry subkey:

HKEY_LOCAL_MACHINE\SYSTEM\CurrentControl
Set\Services\NPS 210\Parameters

This registry key gets created automatically and default values will be entered therein if the subkey does not exist when the NPS 210 is first started.

Special NPS Tokens and the MPAK Payload

Notifications Packet

In one embodiment, an MPAK format can be used for wirelessly transmitting the notification messages to the wireless devices. It is appreciated that any communication protocol can be employed and that the MPAK format is shown herein only as one example. The following are the MPAK notification packet's generalized 'C' definitions:

```
Packet header (Cingular part):
typedef struct {
    UInt8     SenderMan[3];
    UInt8     DestinationMan[3];
    UInt8     Octet7;    // 0x01- Subscription Flags:
                         Mailbox_F
    UInt8     Octet8;    // 0x01 - Packet Type - TEXT
} mpakHeader;
Exchange Manager part:
typedef struct {
    UInt8     time[3];
    UInt8     data[512];
} mpakPayload;
UInt8     dataTypeIndicator;     // range 1 to 3
Char dataType[21];               // max string length is 20.
Must be NULL terminated . . .
The dataTypeIndicator resides at mpakPayload.data[0].
The dataType string begins at mpakPayload.data[1].
NPS Notifications Packet payload:
```

In one embodiment, the "Payload" data for each NPS notification packet consists of variable length NULL terminated ASCII fields sequenced as shown in Table III:

TABLE III

| I. | MSG_ID |
| II. | MSG_SRC |
| III. | ENTERPRISE_MSG_ID |
| IV. | FROM |
| V. | SUBJECT |
| VI. | DATE/TIME (eg: "Fri, 22 Sep 2000 15:27:27") |

The variable length buffer has a total size that does not exceed 512 bytes in length (in this embodiment) and so fields might be truncated by the NPS 210 (when necessary) to ensure that this payload fits. When necessary, the subject (first) and/or the from fields can be optionally truncated by the NPS 210 down to a minimum size of 80 bytes. The average packet size is actually around 100 bytes, for example.

The NPS 210 receives these special tokens via its custom SMTP interface. The "DATA" portion of the SMTP conversation can optionally contain fields to be placed in the NPS 210 packet delivered to the NPS 210 via special SMTP headers or embedded in the message body of the following form:

TOKEN: <ascii data>\r\n

These headers or body (if present) are in the first data block delivered to the NPS 210 whenever the data delivery spans multiple TCP-IP packets. Valid custom NPS 210 tokens are:

| X-PALM-ID | –> maps to —> | MSG_ID |
| X-PALM-SOURCE | –> maps to –> | MSG_SRC |
| X-PALM-ENTID | –> maps to –> | ENTERPRISE_NSG_ID |
| X-PALM-NETID | will be used to address the NPS 210 packet when the recipient cannot be found in the local LDAP directory. | |
| X-PALM-FROM | (if present) will be used instead of the message "from" field. | |

Although every effort is generally made by clients to send the SMTP header values in the message header section, it is possible to add these to the beginning of the message body. The NPS 210 parses the body up until the first line not containing a format of TOKEN: <ascii data>\r\n, as specified above. In the case of duplicates (e.g., msg header contains From: as does msg body), the value in message body is to be used.

Data delivery by the NPS 210 cannot be guaranteed if the NPS 210 is unable to deliver a notification for a user which is not found in LDAP 220/230 and for which a valid X-PALM-NETID has not been supplied. The NPS 210 simply discards such failures and continues.

The above defines the message summary that allows the wireless electronic device to handle pushed mail notifications and to support background retrieval.

Message source and the message IDs relate to the target server and the message identifier that will be needed by the client to retrieve the remainder of the message from the target server. The enterprise message ID is used to indicate a specific enterprise ID that is needed to retrieve a message. NetIDs are the address of a recipient if that address is different from the one in the LDAP database 220/230.

The X-PALM-FROM field is used by the redirector when the message default "from" field is not the real from (this can arise in Enterprise mail support when the redirector must change the user field).

NPS Custom Interface

This is a description of one exemplary implementation for "pushing" packets via the NPS custom interface to a target application on a cingular connected device. This exemplary implementation uses C and TCP/IP as well as uses the Cingular network. The discussion is aimed at pushing packets to an application that resides on a wireless electronic device that is Cingular capable.

Using the NPS Custom Interface and CI (Custom Interface) Protocol Description and rfc: The NPS 210 server opens a TCP/IP port (by default) for the receipt of custom interface packets. A client or server will connect to the NPS 210 on this port and will on successful connection receive the opening banner packet:

"220 Welcome to the NPS 210's RWL Custom Interface; Monday 1$^{st}$ May, 2001 20:00:01"

The client can then respond with 1 or more packets that are to be pushed to one or more device MAN#'s (Cingular network addresses) or to one or more device userids (username).

In the case of the latter the NPS 210 will use the LDAP directory to obtain the MAN# of each user's device. The packet format to be used by the client is described below. Each packet can be addressed to a separate device and there is no limit to the number of packets that can be pushed in a single NPS CI session.

The format of the packet is defined below. The size and content of the packet payload is user defined as the NPS 210 does not examine or otherwise check this portion of the data. It is the CI packet payload that is ultimately delivered to a target device application as defined in the CI structure (below) via its mime type field. The user defines the target application on the target device and this application must recognize the payload format.

In order to receive pushed packets a device based application may first register with an exchange manager service on the wireless electronic device. As part of the registration process, the application tells the exchange manager that it is interested in receiving packets with a particular mime type string. It is this same mime type that the developer defines and then places in the custom interface mime type field. This mime type is used by the exchange manager to route the pushed packets to the target application.

The NPS 210 server will respond with a successful message or error code to each correctly formatted packet received. If successful, the NPS 210 response is:

"Custom IF Message accepted for delivery"

If unsuccessful the NPS 210 response is:

"Error % d: Message rejected"

where % d is an error code that can be used to trace the problem.

Custom Interface Packet Format

The following is an exemplary custom interface packet format that can be used with embodiments of the present invention. This is shown as one example.

```
*   Copyright (C) Palm Computing 2001 -- All Rights Reserved
*
*   This header file contains defines for using the NPS
*   custom interface facility.
*
*   This particular structure contains the generic defines
*   used by any custom applications wanting to push packets
*   to a wireless electronic device.
*
*****************************************************************
#define CustomEyeCatcher          "NPS 210CUSTOM \r\n"
#define CustomEyeCatcherWall      "CUSTOMW"
///////////////////////////////////////////////////
///////////////////////////////////////////////////
//
// This is what gets sent to the NPS 210 custom interface -
// it is the basis for a custom interface pushed packet.
//
// The NPS 210 does not inspect the buffer contents The
// buffer contents are pushed to the device "as is"
//
///////////////////////////////////////////////////
///////////////////////////////////////////////////
typedef struct CustomPacket_Buffer
{
    char                      EyeCatcher [12];
    // Always "NPS 210CUSTCM \r\n"
    char                      palm_user[50];
    // The device user name string (must be null terminated)
    // This user must exist in the LDAP database if supplied
    unsigned long             userID;
    // 32 bit Cingular network address (MAN#) of the target user
    // If supplied it is used instead of the given users LDAP address
    unsigned _int8            DataTypeIndicator;
    // Exchange manager 8 bit data type 1-3 (normally = 2)
    char                      ExchangeManagerMimeType [20];
    // The Exchange Manager mime type (this must be a null terminated string)
    // The target application on the device must register with the exchange manager
    // to receive data packets with this unique mime type. The string is user defined.
    int                       packet_length;
    // used length of the maximum 500 byte payload (defines the length of the data)
    char                      packet_buffer[500];
    // you can use 0-500 bytes as indicated by the packet_length field
    // Note: an MPAK packet buffer may contain up to 512 bytes
    char                      EyeCatcher_Wall[8];
    // Eyecatcher wall always "CUSTOMW" and always at the end of the packet
    // ie. begins at packet_buffer[packet_length]
} CustomPacket_Buffer_Type, * CustomPacketPtr;
```

The preferred embodiment of the present invention, a method and system for pushing electronic messages to a wireless portable device using an Internet server having a standard electronic mail interface, is thus described. While the present invention has been described in particular embodiments, it should be appreciated that the present invention should not be construed as limited by such embodiments, but rather construed according to the below claims.

What is claimed is:

1. A communication system for pushing electronic messages to a wireless portable device to advise a user when an electronic message is received and to provide the user with a subset of the electronic message to allow the user to download electronic messages of interest for viewing at the wireless portable device, comprising:

a mail server comprising a computer system having a processor that executes instructions to implement an electronic mail interface configured to be coupled to the Internet, for storing an electronic mail message received over the Internet and for generating a copy of said electronic mail message;

a notifications server, coupled to said mail server, a computer system having a processor that executes instructions to implement a standard electronic mail protocol for automatically receiving said copy of said electronic mail message as a standard formatted electronic mail message and wherein said notifications server comprises a user information database for providing a mapping between wireless electronic devices and their associated electronic mail addresses;

wherein said mail server automatically forwards using standard mail protocols the copies of the received messages to said notifications server;

wherein said notifications server is for automatically generating, therefrom, a subset of said received copy of said electronic mail message, wherein said subset is a notification message comprising at least one of a sender's identification and a subject field of said received electronic mail message;

wherein said notifications server, upon generation of said subset, is configured to automatically transmit without any user trigger said subset to an identified wireless electronic device associated with a user that is the recipient of said received electronic mail message;

wherein said identified wireless electronic device is operable to display received subsets to a user and wherein the user subsequently is able to select the subset;

wherein said notifications server transmits a remainder of said electronic mail message corresponding to said particular subset in response to said selection and thereby download the remainder of the electronic mail message to said identified electronic wireless device; and wherein a push packet is used by said notifications server to transmit said subset to said identified wireless electronic device.

2. A communication system as described in claim 1 wherein said identified wireless electronic device is a handheld computer system having wirelessly enabled communication.

3. A communication system as described in claim 1 wherein said subset is wirelessly transmitted using a wireless LAN communication network.

4. A communication system as described in claim 1 wherein said subset is wirelessly transmitted using a short range wireless communication network.

5. A communication system as described in claim 1 wherein said standard electronic mail protocol is substantially compliant with the SMTP protocol (Simple Mail Transport Protocol).

6. A communication system as described in claim 1 wherein said standard electronic mail protocol is substantially compliant with the POP protocol (Post Office Protocol).

7. A communication system as described in claim 1 wherein said standard electronic mail protocol is substantially compliant with the IMAP protocol.

8. A communication system for pushing electronic messages to a wireless portable device, comprising:
- a plurality of wireless electronic devices operable to communicate over a wireless communication network;
- a mail server, coupled to the Internet, comprising a computer system having a processor that executes instructions to implement storing an electronic mail message received over the Internet and for generating a copy of said electronic mail message; and
- a notifications server, coupled to said mail server, comprising a computer system having a processor that executes instructions to implement a standard electronic mail protocol for automatically receiving said copy of said electronic mail message as a standard formatted electronic mail message from said mail server and wherein said notifications server comprises a database for providing a mapping between wireless electronic devices and electronic mail addresses;
- wherein said mail server automatically forwards using standard mail protocols the copies of the received messages to the said notifications server;
- wherein said notifications server is for automatically generating, therefrom, a notification message which is a subset of said received copy of said electronic mail message, wherein said notification message comprises at least one of a sender's identification and a subject field of said received electronic mail message; and
- said notifications server, upon generation of said notification message, for transmitting said notification message to an identified wireless electronic device, of said plurality of wireless electronic devices, associated with a user that is the recipient of said received electronic mail message;
- wherein said identified wireless device is operable to display received notification messages to a user and wherein the user subsequently is able to select the subset;
- where said notifications server transmits a remainder of said electronic mail message corresponding to said particular received notification message in response to said selection and thereby download the remainder of the electronic mail message to said identified electronic wireless device; and
- wherein said notification message is transmitted by said notifications server using a push packet.

9. A communication system as described in claim 8 wherein said identified wireless electronic device is a handheld computer system having wirelessly enabled communication.

10. A communication system as described in claim 8 wherein said notifications server comprises a database for providing a mapping between wireless electronic devices and electronic mail addresses.

11. A communication system as described in claim 8 wherein said notification message is transmitted by said notifications server using a wireless LAN communication network.

12. A communication system as described in claim 8 wherein said notification message is transmitted by said notifications server using a short range wireless communication network.

13. A communication system as described in claim 8 wherein said standard electronic mail protocol is substantially compliant with the SMTP protocol (Simple Mail Transport Protocol).

14. A communication system as described in claim 8 wherein said standard electronic mail protocol is substantially compliant with the POP protocol (Post Office Protocol).

15. A communication system as described in claim 8 wherein said standard electronic mail protocol is substantially compliant with the IMAP protocol.

16. A method of communicating electronic messages to a wireless portable device to advise a user when an electronic message is received and to provide the user with a subset of the electronic message to allow the user to download electronic messages of interest for viewing at the wireless portable device, comprising the steps of:
- a) generating, at a mail server implemented on a computer system having a processor, a copy of an electronic mail message that is received over the Internet;
- b) automatically receiving, at a notifications server implemented on a computer system having a processor, said copy of said electronic mail message in a standard electronic mail format and automatically communicated to said notifications server using a standard electronic mail protocol;
- c) storing said received copy of said electronic mail message in a computer readable storage medium coupled to said notifications server;
- d) automatically generating from said received copy of said electronic mail message a notification message which is a subset of said received copy of said electronic mail message; and
- e) upon generation of said notification message, automatically transmitting without any user trigger using a push packet said notification message from said notifications server, over a wireless communication network, to an identified wireless electronic device associated with a user that is the recipient of said received electronic mail message;
- using a database coupled to the notifications server to provide a mapping between wireless electronic devices and electronic mail addresses of received electronic mail messages;
- displaying received notification messages to said user on said identified electronic wireless device wherein the user subsequently is able to select the subset, wherein said subset comprises at least one of a sender's identification and a subject field of said received electronic mail message; and
- in response to said selecting said particular received notification message, said notifications server transmitting a remainder of said electronic mail message corresponding to said particular received notification message and thereby download the remainder of the electronic mail message to said identified electronic wireless device.

17. A communication method as described in claim 16 wherein said standard electronic mail protocol is substantially compliant with the SMTP protocol (Simple Mail Transport Protocol).

* * * * *